L. G. SIEBER.
SCALE.
APPLICATION FILED APR. 6, 1914.
1,109,368.
Patented Sept. 1, 1914.
2 SHEETS—SHEET 1.
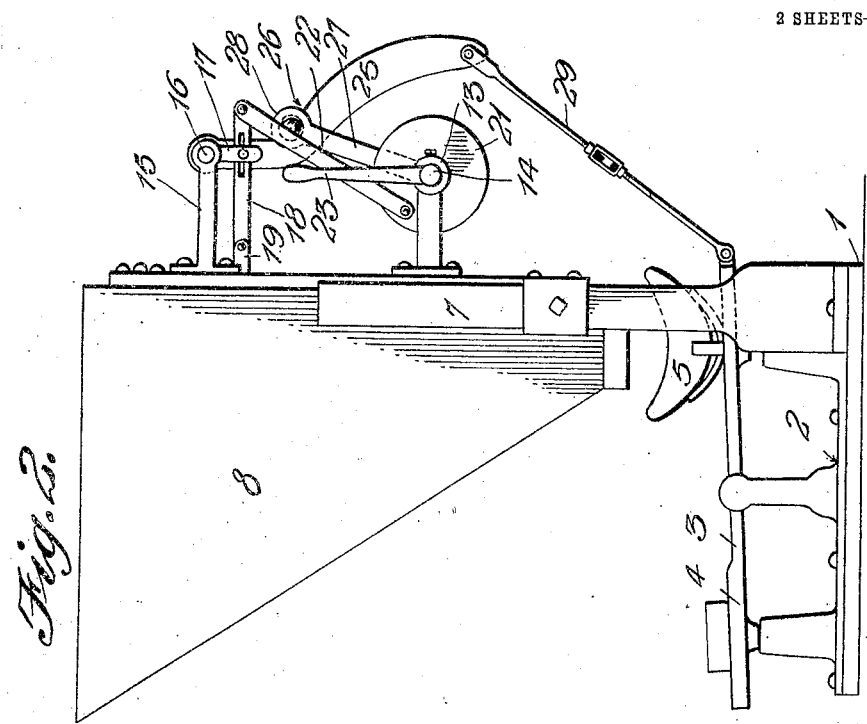
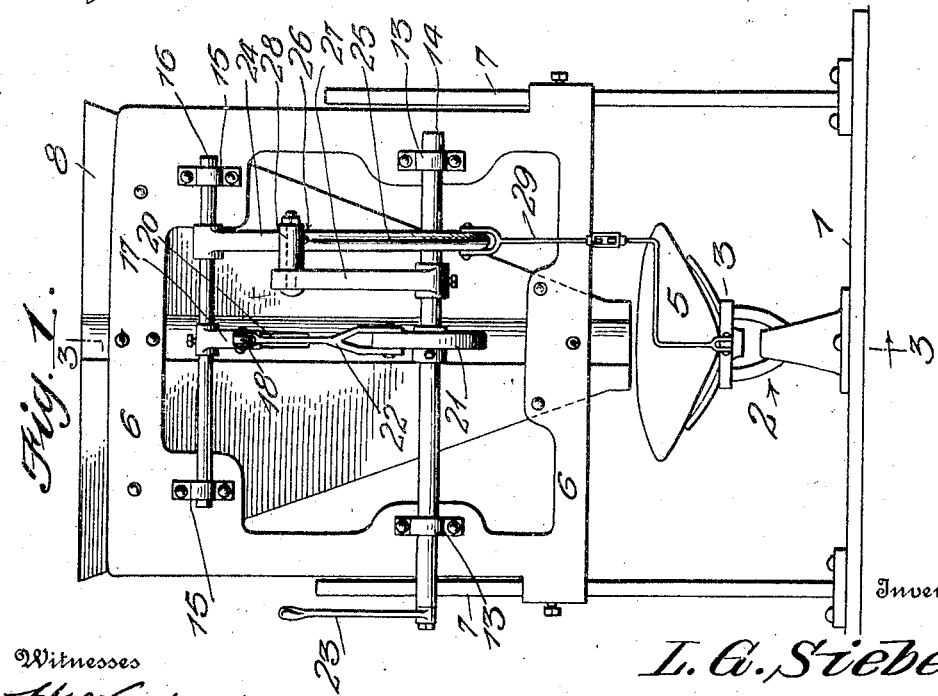
Witnesses
H. Woodard
Inventor
L. G. Sieber
By H. B. Willson & Co
Attorneys L. G. SIEBER.
SCALE.
APPLICATION FILED APR. 6, 1914.
1,109,368.
Patented Sept. 1, 1914.
2 SHEETS—SHEET 2.
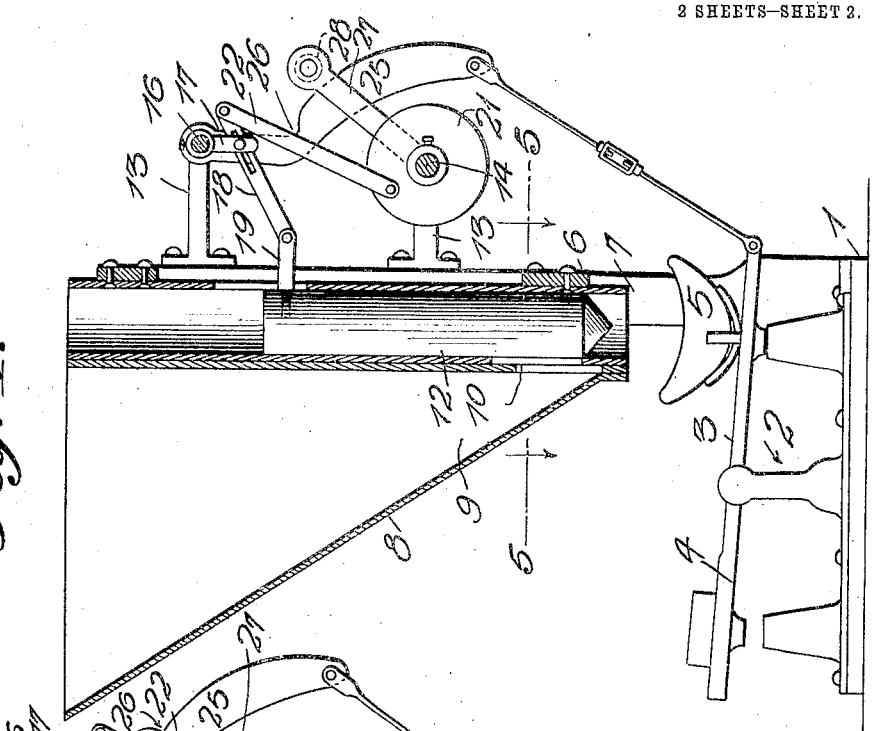
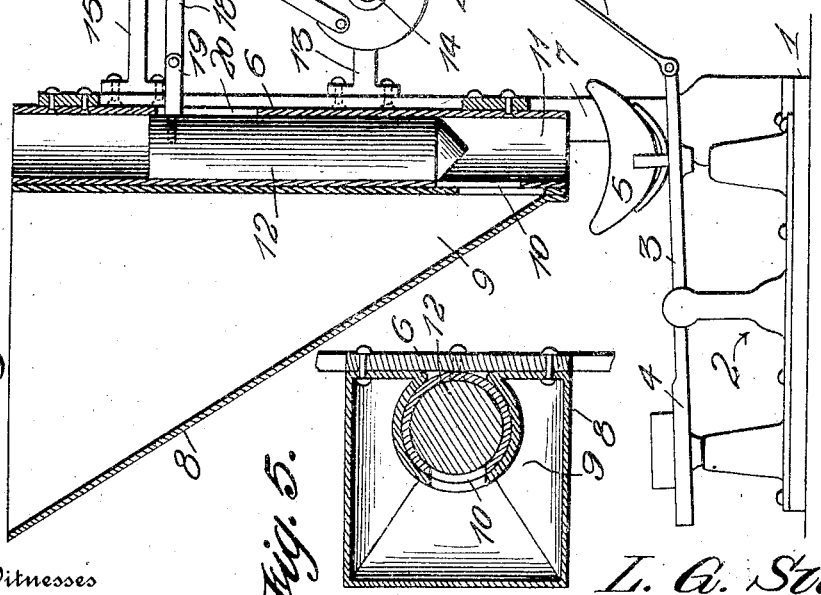
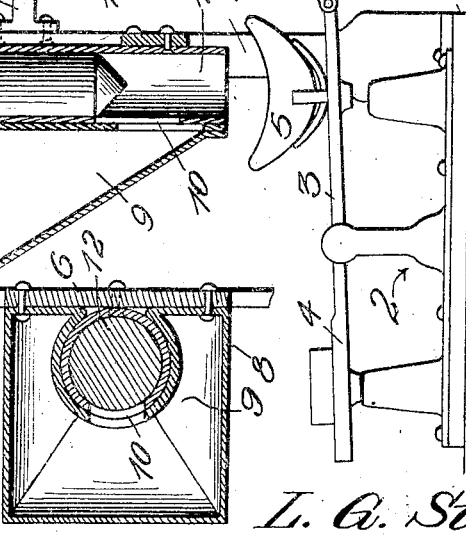
Witnesses
H. Woodard
Inventor
L. G. Sieber
By H. B. Willson & Co.
Attorneys

UNITED STATES PATENT OFFICE.

LAWRENCE G. SIEBER, OF CINCINNATI, OHIO.

SCALE.

1,109,868.        Specification of Letters Patent.        Patented Sept. 1, 1914.

Application filed April 6, 1914. Serial No. 829,946.

*To all whom it may concern;*

Be it known that I, LAWRENCE G. SIEBER, a citizen of the United States, residing at Cincinnati, in the county of Hamilton and State of Ohio, have invented certain new and useful Improvements in Scales; and I do declare the following to be a full, clear, and exact description of the invention, such as will enable others skilled in the art to which it appertains to make and use the same.

This invention relates to new and useful improvements in scales and more particularly to a measuring apparatus therefor and the primary object is to provide a means for supplying materials to a scale and automatic means for cutting off the supply thereof whereby only a predetermined amount may flow to the scale.

A further object of the invention resides in providing an apparatus which may be applied to any scale now in use and a still further object resides in providing a device which is simple and durable in construction, inexpensive to manufacture, and one which will be very efficient and useful in operation.

With these and other objects in view, my invention consists in the novel features of construction, combination and arrangement of parts as will be hereinafter referred to and more particularly pointed out in the specification and claims.

In the accompanying drawings forming part of this application, Figure 1 is a front elevation of a device constructed in accordance with my invention and set up for use; Fig. 2 is an end elevation thereof; Fig. 3 is a vertical transverse section of the device as seen on line 3—3 of Fig. 1 looking in the direction of the arrow; Fig. 4 is a similar view showing the cut-off in its lowered position; Fig. 5 is a horizontal section as seen on line 5—5 of Fig. 4.

In describing the invention, I shall refer to the drawings in which similar characters designates corresponding parts throughout the several views and in which—

1 indicates a base or pedestal upon which is suitably mounted a weighing scale 2, the beam 3 of which has the pans 4 and 5 carried on the ends respectively thereof. The form of scale shown is unimportant so far as this invention is concerned and any desired type of scale may be used in which a pan is provided for the reception of the material or articles to be weighed. In the present instance, the pan 5 will be designated as the pan for such purpose so that if desired, the other pan may be entirely omitted.

My improved device contemplates the provision of means for supplying materials to the scale pan and automatically cutting off said supply when the desired amount has been passed to the scale. To this end, a frame 6 is provided which is mounted for vertical adjustment upon the standards 7 carried at the ends of the pedestal 1. This frame is provided with a housing 8 a portion of which is designed to form a hopper 9, the latter having an outlet opening 10 which leads to a compartment 11 in said housing. The compartment 11 extends vertically of the housing and is open at its lower end, such termination being in vertical alinement with the scale pan 5 above refererd to. Thus the materials contained in the hopper 9 may flow through the outlet opening 10 to a lower portion of the compartment 11 of the housing downwardly to the scale pan which is arranged therebelow. Slidably mounted in the vertically arranged compartment 11 is a plunger or the like 12 which is designed to form a closure for the outlet opening 10 of the hopper 9, said plunger only forming the closure, however, when the same is in its lowermost position in the compartment 11.

I have provided an improved means for manually raising and automatically lowering this plunger and to this end, outwardly extending bearings 13 are provided on the front of the frame 6, the same having mounted for oscillation therein, an actuating shaft 14. Securely mounted in additional outwardly extending bearings 15 above the shaft 14, is an additional shaft 16, the latter being provided with a depending arm or lug 17. The lower end of this arm 17 is bifurcated and fulcrumed between the furcations of this arm is an actuating lever 18. This lever is fulcrumed intermediate of its ends and the inner end thereof has pivotal connection with an upstanding lug 19 carried on the plunger 12. This lug 19 projects through a slot 20 in the front wall of the compartment 11 of the housing 8 and it will be seen from this construction that upon the downward pressure or pull upon the outer end of the lever 18, an upward movement will be given the plunger to cause the same to be disposed to its raised and open position with respect to the outlet opening 10.

Secured on the shaft 14 is a disk-like crank 21 which has pivoted thereto at a point adjacent its peripheral edge, one end of a rod or bar 22. The opposite end of this rod or bar has pivotal connection with the outer end of the actuating lever 18. The one end of said shaft 14 has a manually operable lever 23 secured thereto. Thus it will be seen that upon the actuation of said lever in one direction, the shaft 14 will be oscillated which, from the construction shown and above described, will cause said lever 18 to be swung on its fulcrum point to raise the plunger 12.

Loosely pivoted on the shaft 16 is an additional arm 24 which normally depends therefrom and is offset intermediate of its ends to provide an arcuate lower portion 25. The outer edge of this arcuate portion 25 of the arm 24 is convex and at the upper termination of this convex edge, or, in other words, at the junction of the distorted portion with the remaining portion of the arm, a notch or the like 26 is formed, the purpose of which will appear presently. Also carried on the shaft 14 to be actuated therewith, is an arm 27 the outer end of which has a laterally extending roller 28. This roller is disposed in such position as to engage the convex edge of the arm 24 as the shaft 14 is actuated. When the arm is in such a position as to dispose the arcuate portion 25 thereof downwardly with respect to the frame and the shaft is actuated so as to dispose the roller 28 upwardly on the convex edge of said arm, said roller is adapted to be received in the notch 26 just referred to and assuming that the arm 24 will be yieldingly held in its extended position, said roller will be held in this notch and thus retain the shaft 14 and parts actuated thereby in their actuated positions. In order to permit this portion 25 of the arm 24 to be yieldingly supported in its extended position and actuated at predetermined times, an adjustable connecting rod 29 is provided, the same having connection at its one end with the lower or outer end of the arm 24 and engaged at its opposite end with the end of the scale beam 3 adjacent which the pan 5 is disposed.

In the normal position of the device, that is, just prior to the supplying of the materials to the scale pan, the beam 3 is in an unbalanced position, being so disposed by the application of a weight or weights thereto. In such position of the device, the plunger 12 is in its lowermost position closing the outlet opening 10 of the hopper and the arm 27 is in its lowered position with the roller 28 thereon engaged with the edge of said arm 24 adjacent its outer end. Assuming that the scale has been properly set to weigh a predetermined amount of material, the operator first forces downwardly on the actuating lever 23 which causes the shaft 14 to be partially rotated in its bearings in the direction of the arrow shown in Fig. 2. It will be understood that in the particular position shown and referred to of the scale beam, the connection between said beam and the outer end of the arm 24, will dispose the latter in an extended position with respect to the frame 6 and when the shaft 14 is so actuated as just mentioned, the roller 28 passing upwardly along the convex edge of the arcuate portion of said arm 24 will rest in the notch 26 of said arm. It will also be understood that upon the actuation of the shaft 14, the plunger 12 will be raised to permit the contents of the hopper 9 to flow through the outlet opening 10. The reception of the roller 28 in the notch 26 will cause the shaft 14 to be held in its actuated position so that the plunger will be retained in its raised position thereby permitting the contents to flow steadily through the lower end of the compartment 11 to the scale pan 5. When an amount of material has been received on said pan sufficient to overbalance the weights on the scale, it is obvious that this particular end of the scale beam will be forced downwardly thus drawing downwardly on the lower end of the arm 24 in view of the connecting rod 29 and with such an actuation of the arm 24 the notch will be drawn from the roller 28 thus releasing the engagement therebetween and permitting the arm 27 to be lowered, which will cause the shaft 14 to be returned to its initial position. Such actuation obviously causes the plunger 12 to be returned to its lowered and initial position thus closing the outlet opening 10 and cutting off the flow of material from the hopper. It will thus be seen that while this device is actuated manually in order to start the supply of material to the scale pan, the same actuates automatically to cut off said supply when a predetermined amounted is provided.

From the foregoing, it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the parts of the invention.

Having thus described my invention, what I claim is:

1. In a machine of the class described, a frame, a hopper carried thereon having an opening adjacent the lower end thereof, a sliding closure for the opening, a shaft mounted for oscillatory movement on the frame, a lever fulcrumed intermediate of its ends on the frame and having connection with said closure at its one end, means connecting the opposite end of said lever with said shaft whereby to dispose said closure to its open position with respect to the opening when the shaft is actuated in one direction, means for retaining the shaft and closure in their actuated positions, and additional means for releasing the shaft and closure upon the removal of a predetermined amount of the contents from said hopper.

2. In a weighing device of the class described, a frame, a hopper carried thereon having an outlet opening adjacent its lower end, a sliding closure for said opening, a shaft mounted for oscillatory movement on said frame, a lever fulcrumed intermediate of its ends on the frame and having connection at its one end with said sliding closure, means connecting said shaft with the opposite end of said lever whereby to dispose said closure to its open position upon the actuation of the shaft in one direction, means to lock said shaft and sliding closure in their actuated positions, and additional means in connection with the last referred to means for automatically releasing the shaft and closure upon the removal of a predetermined amount of the contents from said hopper.

3. In a weighing device of the class described, a frame, a hopper carried thereon having an outlet opening adjacent its lower end, a sliding closure for said opening, a shaft mounted for oscillatory movement on the frame, means connecting said shaft with the closure whereby to dispose the latter to its open position with respect to the opening upon the actuation of said shaft in one direction, an arm carried on said shaft for actuation therewith, a locking arm pivotally carried on the frame and having engagement with the first mentioned arm to lock the shaft and sliding closure in their actuated positions, whereby to permit the contents of the hopper to flow therefrom, and means for automatically releasing said locking arm to permit the closure to be returned to its closed position upon the removal of a predetermined amount of the contents from said hopper.

4. In a weighing device of the class described, a frame, a hopper carried thereon having an outlet opening adjacent its lower end, a sliding closure for said opening, a shaft mounted for oscillatory movement on the frame, means connecting said shaft with the closure whereby to dispose the latter to its open position with respect to the opening upon the actuation of said shaft in one direction, an arm carried on said shaft for actuation therewith, a roller carried on the outer end of said arm and extending laterally therefrom, an additional arm pivotally carried on the frame and having an arcuate lower portion thereon, the upper extremity of the arcuate portion terminating in a locking notch, said roller being received in contact with one edge of said arcuate portion and adapted to be received in said locking notch to retain said shaft and closure in their actuated positions, whereby to permit the contents of the hopper to flow through said outlet opening, and means in connection with said additional arm for automatically actuating the same.

5. In a machine of the class described, a frame, a hopper mounted thereon and having an opening adjacent its lower end, a sliding closure for said opening, a rock shaft also mounted on the frame, a lever fulcrumed intermediate of its ends on said frame above the rock shaft and having connection at one of its ends with said closure, means connecting the opposite end of said lever with said rock shaft, to actuate the closure upon the actuation of said rock shaft, an arm carried on said rock shaft for actuation therewith, a locking arm pivotally carried on the frame and having engagement with the last mentioned arm to lock the shaft and sliding closure in their actuated positions, and means for releasing the shaft and closure upon the removal of a predetermined amount of the contents of said hopper.

6. In a machine of the class described, a frame, a hopper mounted thereon having an opening adjacent its lower end, a sliding closure for the opening, a rock shaft also mounted on the frame, a lever fulcrumed intermediate of its ends on the frame above the rock shaft and having one end thereof connected to said closure, a crank on the rock shaft, linking means between said crank and the opposite end of said lever to actuate the closure upon the actuation of the rock shaft, an arm carried on said rock shaft for actuation therewith, an additional arm pivotally carried on said frame and having connection with the last mentioned arm to lock the latter and correspondingly said closure in their actuated positions, and means for operating the additional arm to automatically release the closure upon the removal of a predetermined amount of the contents of said hopper.

7. In a machine of the class described, a housing divided to provide a hopper and a channelway, the latter terminating in an opening in the bottom of said housing and the former also having an opening at its bottom leading to the lower portion of said channelway, a member slidably mounted in the channelway to form a closure for the openings in said housing, and means for actuating said closure.

In testimony whereof I have hereunto set my hand in presence of two subscribing witnesses.

LAWRENCE G. SIEBER.

Witnesses:
JOHN M. RENNER,
AUGUST J. RENNER.